(12) United States Patent
Cazeneuve et al.

(10) Patent No.: US 12,520,999 B2
(45) Date of Patent: Jan. 13, 2026

(54) STEERABLE ELONGATED FUNCTIONAL SYSTEM

(71) Applicant: BASECAMP VASCULAR, Reims (FR)

(72) Inventors: Jean-Baptiste Cazeneuve, Ivry-sur-seine (FR); Camille Maiano, Brélès (FR)

(73) Assignee: BASECAMP VASCULAR, Reims (FR)

( * ) Notice: Subject to any disclaimer, the term of this patent is extended or adjusted under 35 U.S.C. 154(b) by 916 days.

(21) Appl. No.: 17/286,915

(22) PCT Filed: Oct. 25, 2019

(86) PCT No.: PCT/EP2019/079234
§ 371 (c)(1),
(2) Date: Apr. 20, 2021

(87) PCT Pub. No.: WO2020/084133
PCT Pub. Date: Apr. 30, 2020

(65) Prior Publication Data
US 2021/0353130 A1 Nov. 18, 2021

(30) Foreign Application Priority Data
Oct. 25, 2018 (EP) ..................................... 18306392

(51) Int. Cl.
*A61M 25/01* (2006.01)
*A61B 1/005* (2006.01)
*A61B 1/018* (2006.01)

(52) U.S. Cl.
CPC ............ *A61B 1/0052* (2013.01); *A61B 1/018* (2013.01); *A61M 25/0147* (2013.01);
(Continued)

(58) Field of Classification Search
CPC .......... A61M 25/0158; A61M 25/0105; A61M 25/008; A61M 25/0133; A61M 25/0147;
(Continued)

(56) References Cited

U.S. PATENT DOCUMENTS

| | | | |
|---|---|---|---|
| 4,870,951 A | 10/1989 | Suzuki | |
| 4,930,494 A | * 6/1990 | Takehana | ............. A61B 1/0058 600/145 |

(Continued)

FOREIGN PATENT DOCUMENTS

| | | |
|---|---|---|
| EP | 2705871 A1 | 3/2014 |
| GB | 2456165 A | 7/2009 |
| JP | 2008023089 A | 2/2008 |

OTHER PUBLICATIONS

International Search Report on Jan. 30, 2020 in corresponding application No. PCT/EP2019/079234; 4 pgs.

*Primary Examiner* — Laura A Bouchelle
*Assistant Examiner* — Sarah Dympna Grasmeder
(74) *Attorney, Agent, or Firm* — Maier & Maier, PLLC

(57) ABSTRACT

A steerable elongated functional system, such as a catheter or an endoscope, for internally investigating a pipe, a duct or a tube. Especially, an elongated functional system configured to be advanced in the lumen of a pipe, a duct or a tube. The system includes an elongated flexible body, at least one of a first and a second actuator, each being arranged in or on the elongated flexible body, having proximal and distal extremities, and being connectable to an energy source and configured to convey or transform energy to the elongated flexible body to cause a reversible curvature of the elongated flexible body. The elongated body includes an overlapping region where at least the proximal extremity of the first actuator overlaps with at least the distal extremity of the second actuator, and the first and second actuators are (Continued)

mechanically independent from one another and longitudinally offset from one another.

11 Claims, 5 Drawing Sheets

(52) U.S. Cl.
CPC .... *A61M 25/0155* (2013.01); *A61M 25/0158* (2013.01); *A61M 2025/0161* (2013.01); *A61M 2025/0166* (2013.01)

(58) Field of Classification Search
CPC .. A61M 2025/0161; A61M 2025/0058; A61M 2025/0166; A61B 1/0051; A61B 1/0052; A61B 1/0053; A61B 1/0055; A61B 1/0056; A61B 1/0057; A61B 1/0058; A61B 2017/00318
See application file for complete search history.

(56) References Cited

U.S. PATENT DOCUMENTS

| | | | | |
|---|---|---|---|---|
| 5,322,509 | A | * | 6/1994 | Rickerd ............ A61M 25/0041 600/435 |
| 5,897,488 | A | * | 4/1999 | Ueda ........................ B25J 18/06 600/151 |
| 8,558,878 | B2 | | 10/2013 | Bousquet et al. |
| 2004/0030375 | A1 | | 2/2004 | Pierce |
| 2009/0079821 | A1 | * | 3/2009 | Bousquet ............ G01M 13/028 348/E7.085 |
| 2015/0282693 | A1 | * | 10/2015 | Hakkens .............. A61B 1/0011 604/95.05 |

* cited by examiner

STEERABLE ELONGATED FUNCTIONAL SYSTEM

FIELD

The present invention relates to a steerable elongated functional system, such as for example a catheter or an endoscope, for internally investigating a pipe, a duct or a tube. More particularly the system of the invention is suitable for use in the field of surgical and/or medical investigation inside the body of a subject.

BACKGROUND

There is a wide range of applications where there is a need for using a system inside a pipe, a duct or a tube, for example for the placement of the distal part of a tube in a specific location, for bringing light or chemicals, or for bringing a functionality at a remote or hard-to-access place.

When advancing a system in the lumen of a pipe, duct or a tube, it is important that the user can control carefully and precisely the movement and the placement of the system. Placement of systems within pipes is a known technical issue in oil engineering or in motor engineering. Placement of systems within body tubes, such as for example through the ostium (of a vein, an artery, the gastro-intestinal track . . . etc), is also known in the medical field as being a difficult challenge.

For example, the document U.S. Pat. No. 5,322,509 discloses a cardiac catheter which may avoid the need for catheter exchange to access two ostia. Instead of a C-shaped distal part, the catheter described in U.S. Pat. No. 5,322,509 includes a distal portion attached to the intermediate section and consists of a double or a reverse curve (S-shaped). The structure allows the catheter to be utilized to enter either left or right ostium without catheter exchange by rotation of the catheter about its axis. However, this system comprises a plurality of curves. Therefore, during the progression of said guiding means in the aortic artery, the device contacts and pressures the walls of the artery, and can be harmful for the patient.

Nonharmful investigation may be performed by curving appropriately particular zones of a catheter or endoscope by using various kinds of actuators along its structure.

However, the higher the number of actuators on the flexible structure is and the more difficult the activation and the control of said system are.

Consequently, there always is a need for providing optimized systems. Especially, there is a need for elongated systems (such as for example catheters) designed to be advanced in a tube, and having an improved control of their movement within said tube (for example a body tube).

A good steerable functional system intended for nonharmful and controlled investigation should be adaptable to the tortuosity of the tube, for example of the vascular system, and more particularly it should allow to get:
short-radius curves;
tightened and compact double curves (S-shape); and
independent curves.

The document U.S. Pat. No. 8,558,878 B2 discloses a steerable structure wherein the parts of the flexible body including actuators are thickened in order to form short radius curves. However, the thickened parts do not allow compact double curves or independent curves so that complicates the navigation of the steerable structure within the tube, duct or pipe. And, the disclosed structure does not allow forming compact S-shaped curves with a short radius.

Thus, an object of the present invention is to provide steerable systems able to form compact S-shaped curves with short radius that can form independently, for the investigation of a pipe, a duct or a tube, preferably in the human body.

SUMMARY

Thus, the present invention relates to an elongated functional system configured to be advanced in the lumen of a pipe, a duct or a tube, said system comprising:
an elongated flexible body,
at least one first actuator arranged in or on the elongated flexible body,
at least one second actuator arranged in or on the elongated flexible body,
each actuator presenting proximal and distal extremities, being connectable to a source of energy and configured to convey or transform an amount of energy to the elongated flexible body sufficient to cause a reversible curvature of a part of the elongated flexible body
wherein the elongated body includes an overlapping region along which at least the proximal extremity of the first actuator overlaps with at least the distal extremity of the second actuator, characterized in that the first actuator and the second actuator are mechanically independent from one another and longitudinally offset from one another.

According to one embodiment, the elongated flexible body comprises or consists of at least one tube, blade or wire.

Alternatively, the elongated flexible body has a cross-section profile under a form selected from star, circular, semicircular, square, rectangular, triangle, pyramidal or any combinations thereof.

According to another embodiment, the blade presents an upper face on which is arranged the first actuator and a lower face on which is arranged the second actuator.

According to one embodiment, the elongated body includes an overlapping region along which at least the proximal extremity of the first actuator overlaps with at least the distal extremity of the second actuator.

In a particular embodiment, the overlapping region consists of overlapping the proximal extremity of the first actuator with the distal extremity of the second actuator.

According to one embodiment, the first actuator and the second actuator are located on the surface of the elongated flexible body, and are diametrically opposed.

It is possible to have a configuration where the first actuator and the second actuator are fixed at least partially to the elongated flexible body with fixing means in the overlapping region.

Alternatively, the elongated functional system further includes at least a third actuator, wherein the actuators are substantially equidistant one from another in the circumferential direction of the tube.

In a specific embodiment, the elongated functional system further comprises at least a third actuator and at least a second overlapping region distinct from the first overlapping region and along which the proximal or the distal extremity of the third actuator faces the proximal or the distal extremity of at least one of the first actuator or of the second actuator.

According to one embodiment, the actuators are configured for being actuated independently one from the other.

According to one embodiment, the elongated functional system is a catheter, a catheter guide or an endoscope.

The present invention also relates to a method for controlling advancement of the elongated functional system of the invention, in the lumen of a pipe, a duct or a tube, said method comprising:
  introducing and advancing the elongated functional system in a pipe, a duct or a tube, and
  controlling the actuators depending on the shape of the pipe, the duct or the tube by transmitting independently or simultaneously energy to said actuators so as to cause a simple curvature or a S-shaped curvature of a part of the elongated flexible body comprising an overlapping region.

Alternatively, in the method of the invention:
  the tube is the aortic arch,
  the first actuator and the second actuator are arranged in the distal part of the elongated flexible body,
  the first actuator being the distal actuator and the second actuator being the proximal actuator, and wherein controlling the first and second actuators comprises:
  activating one of the two actuators and pushing the functional system toward a distant part of the aortic arch,
  releasing the actuated actuator,
  activating the second and proximal actuator for stabilizing the functional system and then activating the first and distal actuator for obtaining a compact short radius S-shaped curve in order to reach the ostium.

According to one embodiment, in the method of the invention, activating actuators comprises using physical and/or chemical means.

In the present invention, the following terms have the following meanings:

"About": is used herein to mean approximately, roughly, around, or in the region of. When the term "about" is used in conjunction with a numerical range, it modifies that range by extending the boundaries above and below the numerical values set forth. According to one embodiment, the term "about" preceding a figure means plus or less 10% of the value of said figure.

"Actuator": can be any type of string, cable, wire, ribbon, tube or any set of those, capable of activating the body part to which it is fixed in order to trigger a function or to induce a bending of an area of the body part to which it is fixed. Actuators according to the invention may be materials and devices that are able to change their shape in response to changes in environmental conditions and perform mechanical work. An actuator may convey energy. Most of the time, an actuator transforms the received energy into another type of energy. In one embodiment, the actuator receives an electrical current which is transformed into heat thanks to Joule effect, and upon action of the heat, it contracts.

"Catheter" is a tubular medical device for insertion into canals, vessels, passageways or body cavities for diagnostic or therapeutic purposes such as to permit injection/withdrawal of fluids, to keep passageways open, to inspect internal organs and tissues and to place medical tools into position for medical treatment within the body of an animal or of a human. In this invention, the term "catheter" encompasses any cannula or medical probe designed for insertion in a human or animal canal, vessel, passageway or body cavity.

"to curvate": means to take the form of a curvature, to bend. Having a curvature or being curved is used in opposition to being straight. The term "curvature" means non-zero curvature. The curvature can be positive or negative.

"Elongated": refers to an element such as a body, or a system that extends longitudinally.

"Flexible": refers to an object that may bend without breaking.

"to overlap": relates to the spacial positioning of at least two elements relative to each other; in which the first element has at least one part that covers, directly or indirectly, at least one part of the other(s) element(s). According to one embodiment, the term "overlaps" relates to a part of a first actuator, for example one of its extremities, covering a part of a second actuator, said first and second actuators being located on the surface of a body and being diametrically opposite on said body. According to one embodiment, the overlapping region is characterized by its length (noted W). According to one embodiment, in the case of a blade shape elongated body, the first and second actuators are respectively fixed on two opposite faces of the blade and are thus parallel along the overlapping region, the first part facing with the second part.

"mechanically independent devices" relates to self-supporting devices such as actuators that are independent from one another and which are sufficient from a mechanical point of view. Each independent device can be actuated separately and is autonomous.

DETAILED DESCRIPTION

Elongated Functional System

This invention relates to an elongated functional system 1 which may be a catheter, a catheter guide or endoscope, intended to be used for investigating a pipe, a duct or a tube.

One goal of this invention is to provide a steerable system able to form compact S-shaped curves made by two sections associated to actuators, said sections can be activated independently with a short radius, for the investigation of a pipe, a duct or a tube, preferably in the human body.

Figure 1:
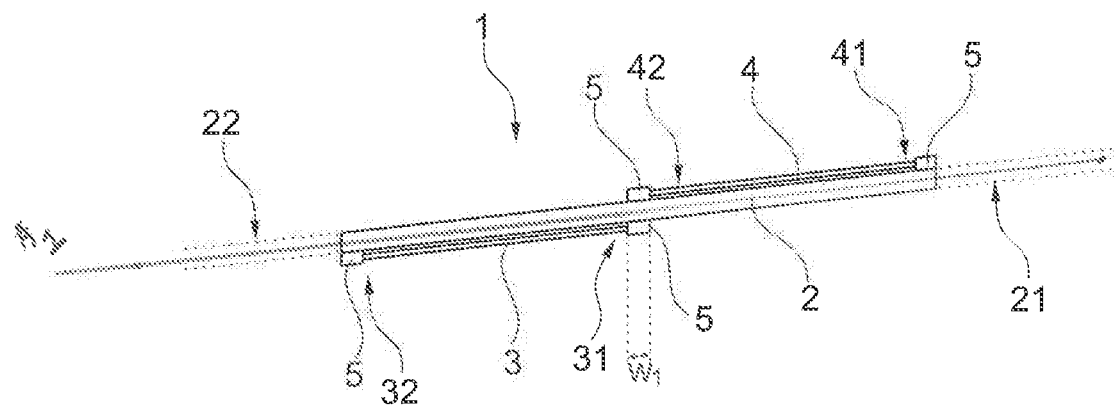
FIGS. 1 to 3 represent examples of elongated systems according to the invention having an overlapping zone of three different lengths, the actuators being not activated.

As illustrated in FIG. 1, the system includes an elongated body 2, which is flexible, and presents a proximal part 21 and a distal part 22. The distal part 22 is contiguous to proximal part 21 and extends it. The elongated body 2 has an axis of symmetry A1. If the elongated body 2 was a blade, A1 would be a symmetry plan rather than a symmetry axis.

The elongated flexible body 2 may for example be in the form of a cylindrical shape, for example of a circular section (i.e. a tube). In other non-shown embodiments, the flexible body 2 may be cylindrical with another possible section, such as a cross-section profile under a form selected from star, circular, semicircular, square, rectangular, triangle, pyramidal or any combinations thereof. According to an embodiment, the elongated flexible body may contain three tubes or more. For example, the elongated body may be formed by three tubes arranged in a pyramidal shape, that is, two parallel and contiguous tubes and a third tube on top of them.

The elongated flexible body 2 may for example have a length ranging from 10 cm to 200 cm; preferably from 50 cm to 150 cm; more preferably is about 120 cm. According to one embodiment, the elongated functional system 1 has a length from 10 cm to 190 cm; preferably from 10 cm to 180 cm, from 10 cm to 170 cm, from 10 cm to 160 cm, from 10 cm to 150 cm, from 10 cm to 140 cm, from 10 cm to 130 cm, from 10 cm to 120 cm, from 10 cm to 110 cm, from 10 cm to 100 cm, from 10 cm to 90 cm, from 10 cm to 80 cm, from 10 cm to 70 cm, from 10 cm to 60 cm, from 10 cm to 50 cm, from 10 cm to 40 cm, from 10 cm to 30 cm, or from 10 cm to 20 cm. According to one embodiment, the elongated functional system 1 has a length from 20 cm to 200 cm; preferably from 30 cm to 200 cm, from 40 cm to 200 cm, from 50 cm to 200 cm, from 60 cm to 200 cm, from 70 cm to 200 cm, from 80 cm to 200 cm, from 90 cm to 200 cm, from 100 cm to 200 cm, from 110 cm to 200 cm, from 120 cm to 200 cm, from 130 cm to 200 cm, from 140 cm to 200 cm, from 150 cm to 200 cm, from 160 cm to 200 cm, from 170 cm to 200 cm, from 180 cm to 200 cm, or from 190 cm to 200 cm. According to an embodiment, the length of the flexible body is in the range 500 mm to 3000 mm, preferably 400 mm to 1200 mm.

According to an embodiment, the width or diameter of the flexible body is in the range 100 μm to 12 mm. According to one embodiment, the elongated flexible body 2 has a diameter ranging from more than 0 mm to 12 mm; preferably from 0.5 mm to 3 mm. According to one embodiment, the elongated functional system 1 has a diameter of about 1, 2, 3, 4, 5, 6, 7, 8, 9, 10, 11 or 12 mm. According to one embodiment, the elongated functional system 1 has a diameter of about 0.1; 0.2; 0.3; 0.4; 0.5; 0.6; 0.7; 0.8; 0.9 or 1 mm. According to one embodiment, the elongated flexible body 2 has a diameter ranging from more than 0 μm to 500 μm; preferably from 10 μm to 200 μm; more preferably of about 150 μm or 170 μm.

According to an embodiment, the body 2 is made for example of elastic or another flexible material, or an elastic material assembly. In one embodiment, the body part 2 is made of polymer flexible material suitable for invasive use. In one embodiment, the body 2 is made of a super-elastic alloy. Any super-elastic alloy may be used in this invention. In one embodiment, the super-elastic alloy is nitinol.

A first actuator 3 is arranged on the elongated flexible body 2, and includes a proximal extremity 31 and a distal extremity 32. A second actuator 4 is arranged on the same elongated body 2 and includes a proximal extremity 41 and a distal extremity 42. Specifically, the first actuator 3 is arranged in the distal part 22 of the elongated body 2 and the second actuator 4 is arranged in the proximal part 21. With such configuration, the first actuator 3 and the second actuator 4 are mechanically independent from one another and axially offset along the axis A1 of symmetry of the elongated functional body 2. It is possible to activate only one actuator 3 or 4 and obtain a J shaped curve. This allows forming independent short radius curves when necessary during progression of the functional system in the tub. Being mechanically independent, each actuator can be actuated separately and guide the associated elongated functional system 1 in a specific direction. In addition, being axially offset along A1, the curvatures obtained can lead to a S-shaped configuration. The axial/longitudinal offset along A1 is important in this matter, otherwise an S-shaped form could not be reached.

The first and second actuators 3, 4 are arranged:
i) in two opposite zones of the perimeter of the section of the body 2. According to one embodiment, when the body 2 has a circular section, the second actuator 4 may be located in a circumferential direction of the tube at 120° to 240° from first actuator 3, and preferably the first and second actuators 3, 4 are diametrically opposed while being axially offset,
ii) successively on the elongated body 2, but define an overlapping region W in the longitudinal direction wherein the proximal extremity 31 of the first actuator 3 meets and faces the distal extremity 41 of the second actuator 4.

According to an embodiment, the functional system 1 includes at least a third actuator. According to an embodiment, the first, second and third actuators are equidistant one from another in the circumferential direction of the tube. According to an embodiment, the elongated functional system further comprises at least a third actuator and at least a second overlapping region distinct from the first overlapping region and along which a proximal or a distal extremity of the third actuator faces the proximal or the distal extremity of at least one of the first or second actuator.

According to an embodiment, the system further comprises at least a third and a fourth actuators and at least a second overlapping region distinct from the first overlapping region along which a proximal extremity of the third actuator faces a distal extremity of the fourth actuator.

As illustrated on FIG. 1, the overlapping region is characterized by its length W ranging from more than 0 mm to the size of one of the actuators. According to one embodiment, the length of the overlapping region W is about the size of one fixing mean of the actuator on the body 2. According to one embodiment, the length of the overlapping region W is about the size of two fixing means of the actuator on the body 2. According to one embodiment, the length of the overlapping region W is higher than the size of two fixing means of the actuator(s) on the body 2.

According to one embodiment, the length of the overlapping region W ranges from more than 0% to 95% of the length of at least one of overlapped actuators. According to one embodiment, W ranges from 1% to 50%, preferably from 5% to 40%, from 10% to 30%, of the length of at least one of overlapped actuators.

According to an embodiment, the length of the overlapping region W is in the range 2 mm to 30 mm. For example, when length of the actuators is 35 mm, W ranges from 5 mm to 20 mm.

Figure 2:
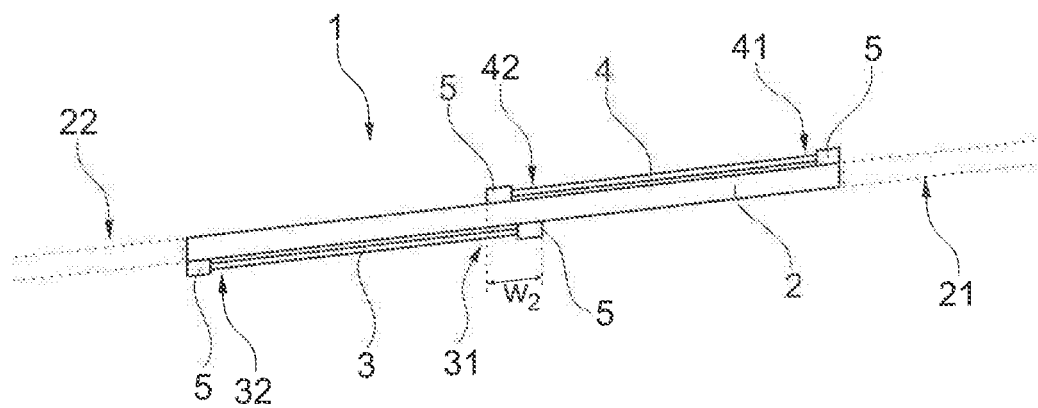
Figure 3:
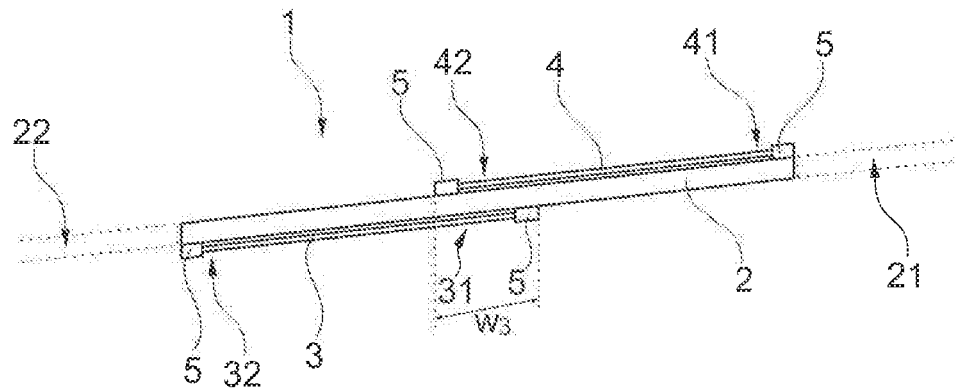

The embodiments of FIGS. 1, 2 and 3 are globally similar but the three elongated functional systems include overlapping regions of variable lengths W1, W2 and W3.

For example: W1 ranges from 2 mm to 10 mm,
W2 ranges from 4 mm to 20 mm, and
W3 ranges from 5 mm to 30 mm.

According to one embodiment, the actuator 3, 4 may be in the shape of a wire, an ensemble of wires or a blade of memory type. According to one embodiment, the blade shaped elongated body is advantageous in that it bends along a predictable direction. Moreover, it presents two opposite planar surfaces suitable for an easy integration of elements such as actuators. According to an embodiment, the blade presents an upper face on which is arranged the first actuator and a lower face on which is arranged the second actuator.

According to one embodiment, the actuators 3, 4 may be actuated by any techniques known by the skilled artisan, including physical and/or chemical means. According to one embodiment, the actuator 3, 4 may be actuated by any actuating techniques such as those comprising using balloons that are inflated with air or fluid. According to one embodiment, the actuator 3, 4 may be actuated by using a material able to react to a physical stimulus such as electrical signal or heat, for example. According to an embodiment, the actuator 3, 4 is made of, or comprises:

a shape memory alloy, and/or an active polymer, and/or a piezo-electric material.

According to an embodiment, at least one of the actuators is made of nitinol, for example composed of 50% of Ni and 50% of Ti.

In one non-shown embodiment, the elongated functional system 1 further comprises an energy source, such as for example an electric energy source, and means for providing and/or for transmitting energy from the energy source to the first actuator 3 and/or to the second actuator 4. Said energy is transformed by the actuating element-actuator 3 or 4—into a mechanical energy so as to obtain a curvature, thus facilitating the navigation inside the tube, pipe or duct. Since the actuators 3 and 4 are independent, they can be actuated independently by the energy source.

According to one embodiment, each actuator is connected to at least two conductive wires. According to one embodiment, two actuators are connected to at least three conductive wires. According to one embodiment, the conductive wire is made of copper. For example, a first set of conductive wires may be connected to the first actuator 3 and a second set of conductive wires connected to the second actuator 4. Alternatively, both of the first and second actuators may be connected by the same wire or set of wires.

The conductive wire(s) is/are arranged to provide or to transmit an electric current along their longitudinal portion to the first actuator and/or the second actuator in a controlled manner. According to another embodiment, the elongated functional system 1 further comprises an external control unit located at a proximal end of the elongate functional system. The control unit comprises at least one controller device configured to actuate independently or simultaneously the actuators.

According to one embodiment, the first set of conductive wires is connected to a first controller. According to one embodiment, the second set of conductive wires is connected to a second controller. The first controller and/or the second controller allow applying an electric current to respectively the first actuator and/or the second actuator by means of the conductive wires, thereby providing the actuation of at least one of said actuators.

According to one embodiment, the overlapped actuators are configured for being actuated independently one from the other. This allows forming independent short radius curves when necessary during progression of the functional system in the tube.

According to one embodiment, even if actuators are not actuated, the overlapping region between the overlapped actuators allows achieving a rigidity that creates the principle of reserve. According to one embodiment, when at least one actuator is actuated, the overlapping region becomes more rigid. According to the invention, when at least one actuator is actuated, the stiffening of the overlapping region induces curving of the actuated actuator on the non-overlapped portion, and said resulting curve radius is shorter than the curve radius obtained without the presence of the overlapping region.

According to one embodiment, when two opposite actuators that overlap are actuated, the stiffening of the overlapping region amplifies the curvature of the two actuated actuators and the body 2 takes a S-shape form; said S-shape curve is shorter and more compact than those obtained without the presence of the overlapping region. According to another embodiment, at least two actuators may be actuated together for forming an S-shaped double curve. This allows a more efficient control of the functional system in particular when navigating through a tube having two successive compact and opposite curvatures.

According to one embodiment, the curves triggered by each actuator may be generated independently in a controlled way.

According to one embodiment, the S-shape curve is characterized by two curve radius $r_1$ and $r_2$. According to one embodiment, $r_1$ and $r_2$ are, each taken independently, higher or equal to 3 mm. According to one embodiment, the S-shape curve is characterized by the length of the curve L (i.e. the length of the shortest straight line from the beginning to the end of the S-shape curve). According to one embodiment, the lengths of the curves L obtained according to the invention are shorter than those obtained without the presence of the overlapping region.

Each actuator 3, 4 is fixed to the elongated body 2 by using fixing means 5. Advantageously, in one non-shown embodiment the first and second actuators 3, 4 may be fixed by using the same fixing means in the overlapping region. This allows reducing the number of fastening means.

In FIGS. 1 to 3, the actuators 3, 4 are not activated. The activation of the first actuator 3 and/or of the second actuator 4 drives the deformation respectively of said actuators.

As the actuators are fixed to the elongated body 2, the deformation of the actuators (i.e. a shortening of the length of the actuator and/or a curvature of the actuator) results in the curvature of the elongated body 2. Especially, the actuation of the overlapped actuators fixed to the elongated body 2 allows a better compactness of their curvatures. More precisely, the curved parts are those parts to which the actuators are fixed, but not the overlapping region.

Figure 4:
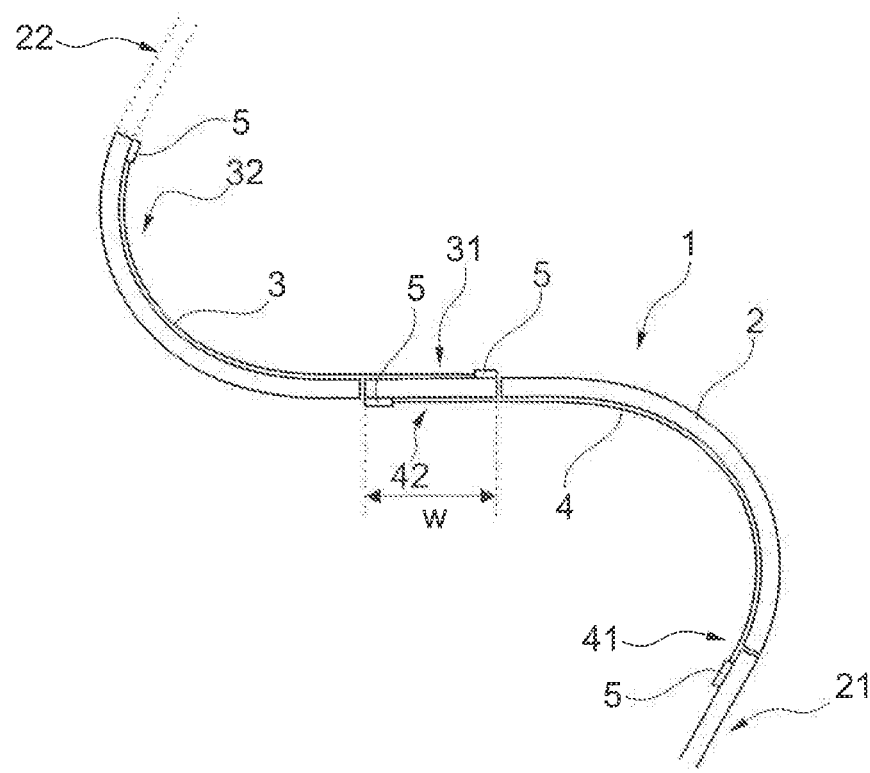
FIG. 4 shows the system of FIG. 3 wherein both actuators have been actuated so as to form a S-shaped form.

FIG. 4 shows an elongated functional system 1 similar to that of FIG. 3 with a slight difference in the length of the overlapping region W. In this embodiment as shown, both actuators 3, 4 have been activated so that a compact double curvature (S-shape) is obtained.

Figure 5:
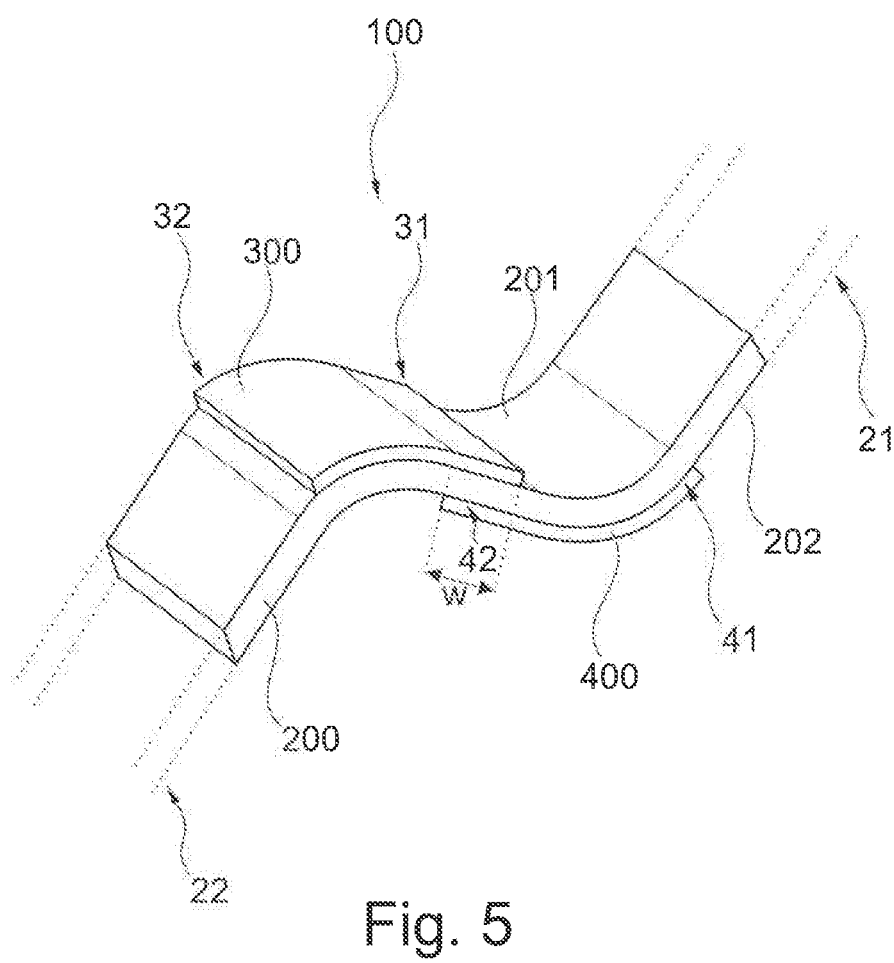
FIG. 5 shows elongated functional systems according to the invention having a blade shape, the actuators being activated.

FIG. 5 shows another embodiment of an elongated functional system 100 including an elongated body 200 having a blade shape, such blade has also a symmetry plane not represented. The body 200 includes (inside or on the body) a first and a second actuators 300 and 400 axially offset along the elongated body 200 and defining an overlapping region W. The first actuator 300 is fixed to the upper face 201 of the body 200 while the second actuator 400 is fixed to the bottom face 202 of the elongated body 200. According to an embodiment, the actuators 300, 400 are also of a blade shape. However, other shapes are also possible. For example, the first and/or the second actuators may include one or more elongated wires.

Figure 6:
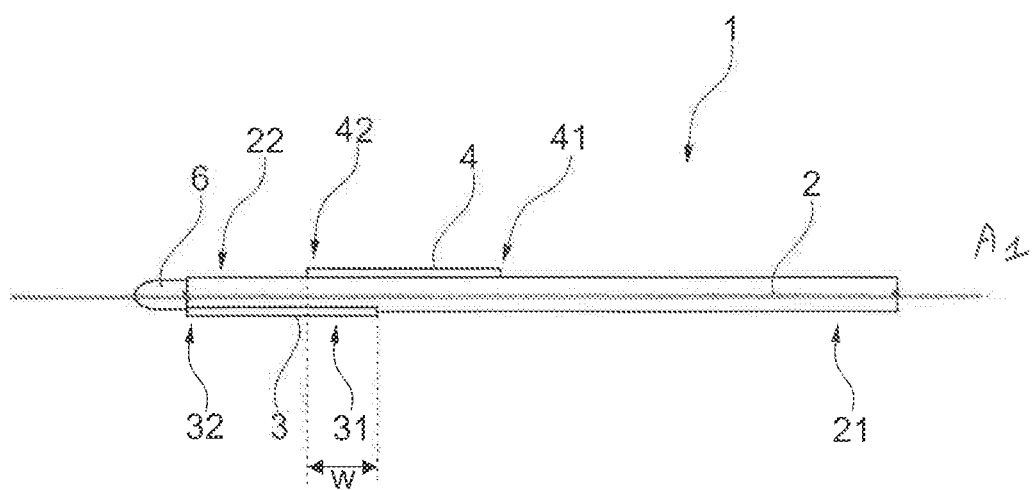
FIG. 6 is a preferred embodiment of the elongated system of the invention, the actuators not being activated.

FIG. 6, shows another embodiment wherein the elongated flexible body 2 presents a distal part 22 having a tip 6 and comprising the first actuator 3. This advantageous embodiment allows to master guidance of the distal part of the functional system during its progress in the tube (or pipe or duct). The elongated flexible body 2 has a longitudinal axis A1. The presence of the tip 6 allows protection of the tube from any perforation or hit that could be caused by the flexible body, and that could affect the integrity of the walls of the tube, or harm a patient in case the tube is the aortic artery for example.

Method for Controlling Advancement

The present invention also relates to a method for controlling advancement of the elongated functional system of the invention, in the lumen of a pipe, a duct or a tube.

According to one embodiment, said method comprises:
  introducing and advancing the elongated functional system 1 in a pipe, a duct or a tube, and
  controlling at least two actuators 3, 4 depending on the shape of the pipe, the duct or the tube by transmitting independently or simultaneously energy to said actuators so as to cause a simple curvature or a S-shaped curvature of a part of the elongated flexible body comprising an overlapping region.

According to one embodiment, the method is particularly suitable for surgical and/or medical investigation. According to one embodiment, the tube is a vein or an artery, preferably is the aortic arch.

According to one embodiment, the first actuator and the second actuator are arranged in the distal part of the elongated flexible body 2.

According to one embodiment, controlling the first and second actuators comprises:
  activating one of the two actuators and pushing the functional system toward a distant part of the aortic arch,
  releasing said actuator, and/or
  activating the other actuator for stabilizing the functional system and then activating this other actuator for obtaining a compact short radius S-shaped curve in order to reach the ostium.

According to one embodiment, controlling of the actuators 3, 4 comprises:
  activating one of the two actuators 3 or 4 and pushing the functional system toward a distant part of the aortic arch,
  releasing the actuated actuator 3 or 4
  activating the second and proximal actuator 4 for stabilizing the functional system and then activating the first and distal actuator 3 for obtaining a short radius S-shaped curve in order to reach the ostium while avoiding snapping effect.

The first actuator being the distal actuator and the second actuator being the proximal actuator.

According to one embodiment, the method of the invention further comprises a step for deactivating the elongated functional body 2.

Figure 7:
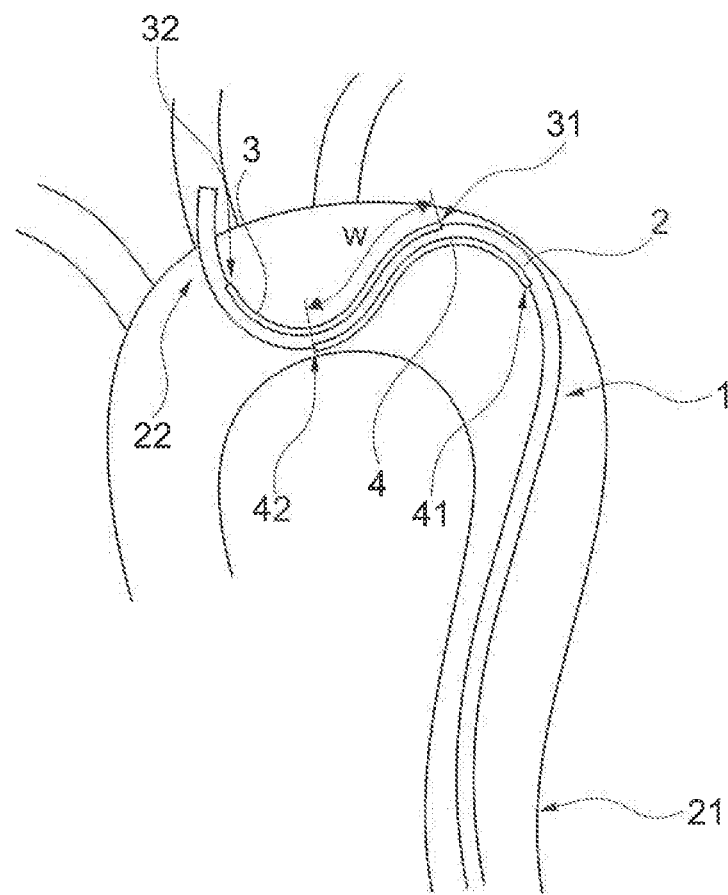
FIG. 7 shows an elongated functional system according to the invention introduced in the aortic arch in order to reach the supra aortic trunk ostium.

An example of a pipe where the elongated functional system according to the invention may be used is illustrated by FIG. 7. The elongated functional system 1 is introduced and advanced in the pipe. The actuators 3, 4 are then controlled depending on the shape of the tube by transmitting independently or simultaneously energy to the actuators so as to cause a simple curvature (by actuating only one actuator) or a S-shaped curvature (by actuating the two actuators) of a part of the elongated body 2 comprising the overlapping zone W. This allows for example to guide the distal extremity of the system to the ostium of the aortic arch. In FIG. 7, the two actuators 3, 4 have been activated and thus provide a S-shaped curve.

The invention claimed is:

1. An elongated functional system configured to be advanced in the lumen of a pipe, a duct or a tube, said system comprises:
  an elongated flexible body,
  at least one first actuator in the shape of a wire, made of a material able to react to electricity, and arranged in or on the elongated flexible body,
  at least one second actuator in the shape of a wire, made of a material able to react to electricity, and arranged in or on the elongated flexible body,
  each of the at least one first actuator and the at least one second actuator presenting proximal and distal extremities, being connectable to a source of electrical current and configured to transform an amount of electrical current to cause a reversible curvature of the at least one first actuator and the at least one second actuator, the curvature of each one of the at least one first actuator and the at least one second actuator causing a reversible curvature of a part of the elongated flexible body,
  wherein the elongated body includes an overlapping region along which at least the proximal extremity of the at least one first actuator overlaps with at least the distal extremity of the at least one second actuator, and
  wherein the at least one first actuator and the at least one second actuator are mechanically independent from one another and longitudinally offset from one another.

2. The elongated functional system according to claim 1, wherein the elongated flexible body comprises or consists of at least one tube, blade or wire.

3. The elongated functional system according to claim 2, wherein the elongated body comprises the blade, and the blade presents an upper face on which is arranged the at least one first actuator and a lower face on which is arranged the at least one second actuator.

4. The elongated functional system according to claim 1, wherein the elongated flexible body has a cross-section profile under a form selected from star, circular, semicircular, square, rectangular, triangle, pyramidal or any combinations thereof.

5. The elongated functional system according to claim 1, wherein the overlapping region consists of overlapping the proximal extremity of the at least one first actuator with the distal extremity of the at least one second actuator.

6. The elongated functional system according to claim 1, wherein the at least one first actuator and the at least one second actuator are located on a surface of the elongated flexible body, and are diametrically opposed.

7. The elongated functional system according to claim 1, wherein the at least one first actuator and the at least one second actuator are fixed to the elongated flexible body with fixing means in the overlapping region.

8. The elongated functional system according to claim 1, which is a catheter, a catheter guide or an endoscope.

9. A method for controlling advancement of the elongated functional system according to claim 1, in the lumen of a pipe, a duct or a tube, said method comprising:
  introducing and advancing the elongated functional system in a pipe, a duct or a tube, and
  controlling at least one of the at least one first actuator and the at least one second actuator depending on the shape of the pipe, the duct or the tube by transmitting independently or simultaneously energy to said at least one first actuator and at least one second actuator so as to cause a simple curvature or a S-shaped curvature of a part of the elongated flexible body comprising the overlapping region.

10. The method according to claim 9, wherein:

the tube is the aortic arch, the at least one first actuator and at least one the second actuator are arranged in a distal part of the elongated flexible body, the at least one first actuator being the distal actuator and the at least one second actuator being the proximal actuator, and wherein controlling the at least one first actuator and the at least one second actuator comprises:

activating the at least one first actuator and the at least one second actuator and pushing the functional system towards a distant part of the aortic arch, releasing the at least one first actuator and the at least one second actuator, activating the at least one second and proximal actuator for stabilizing the functional system and then activating the at least one first and distal actuator for obtaining a compact short radius S-shaped curve in order to reach the ostium.

11. The method according to claim 9, wherein activating the at least one first actuator and the at least one second actuator comprises using physical and/or chemical means.

\* \* \* \* \*